Figure 6:
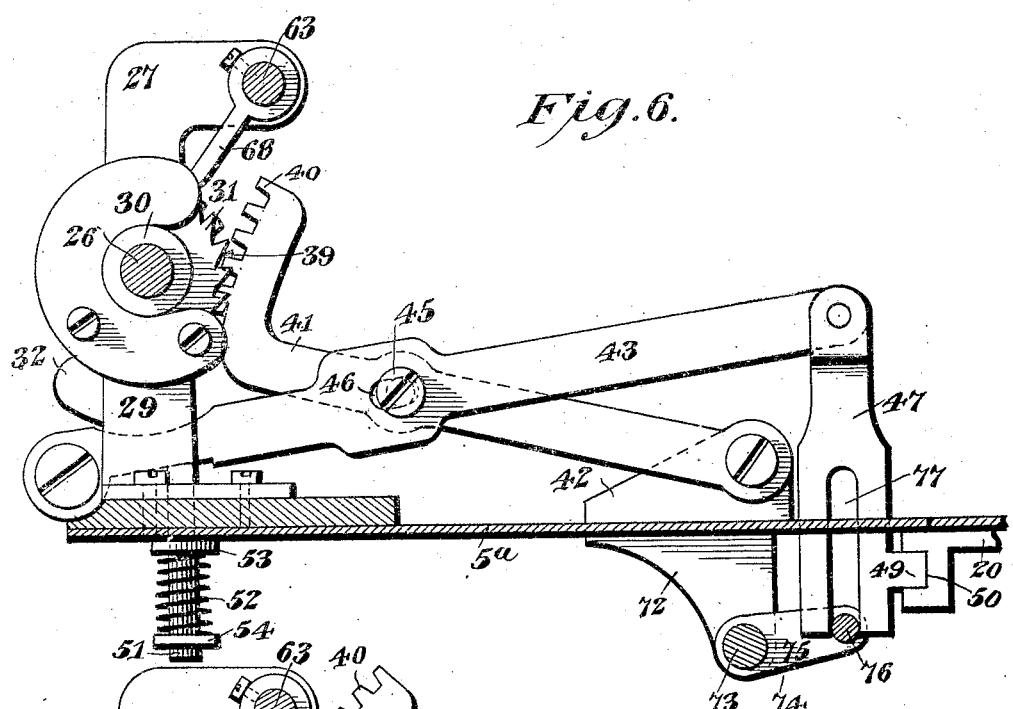

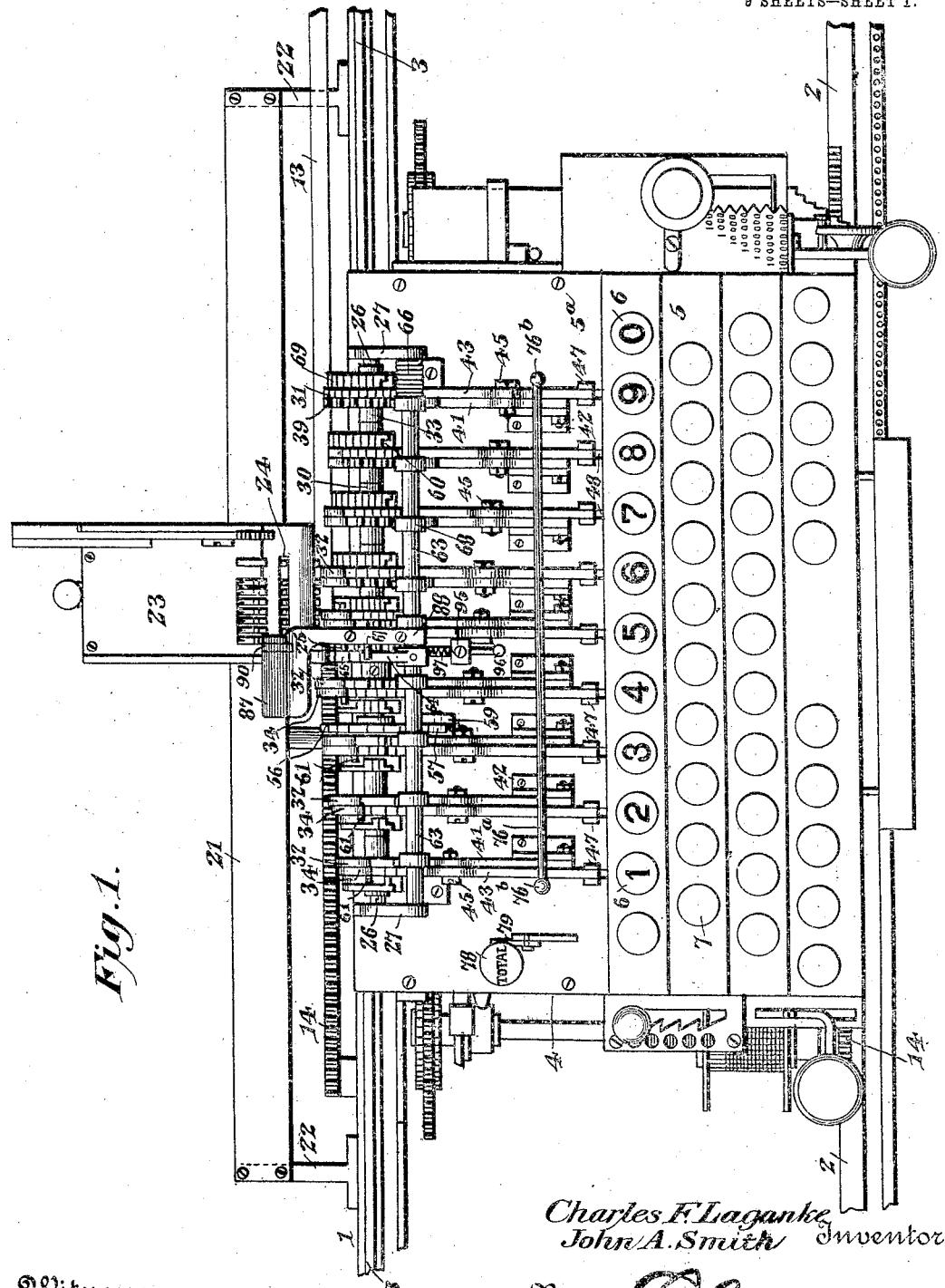

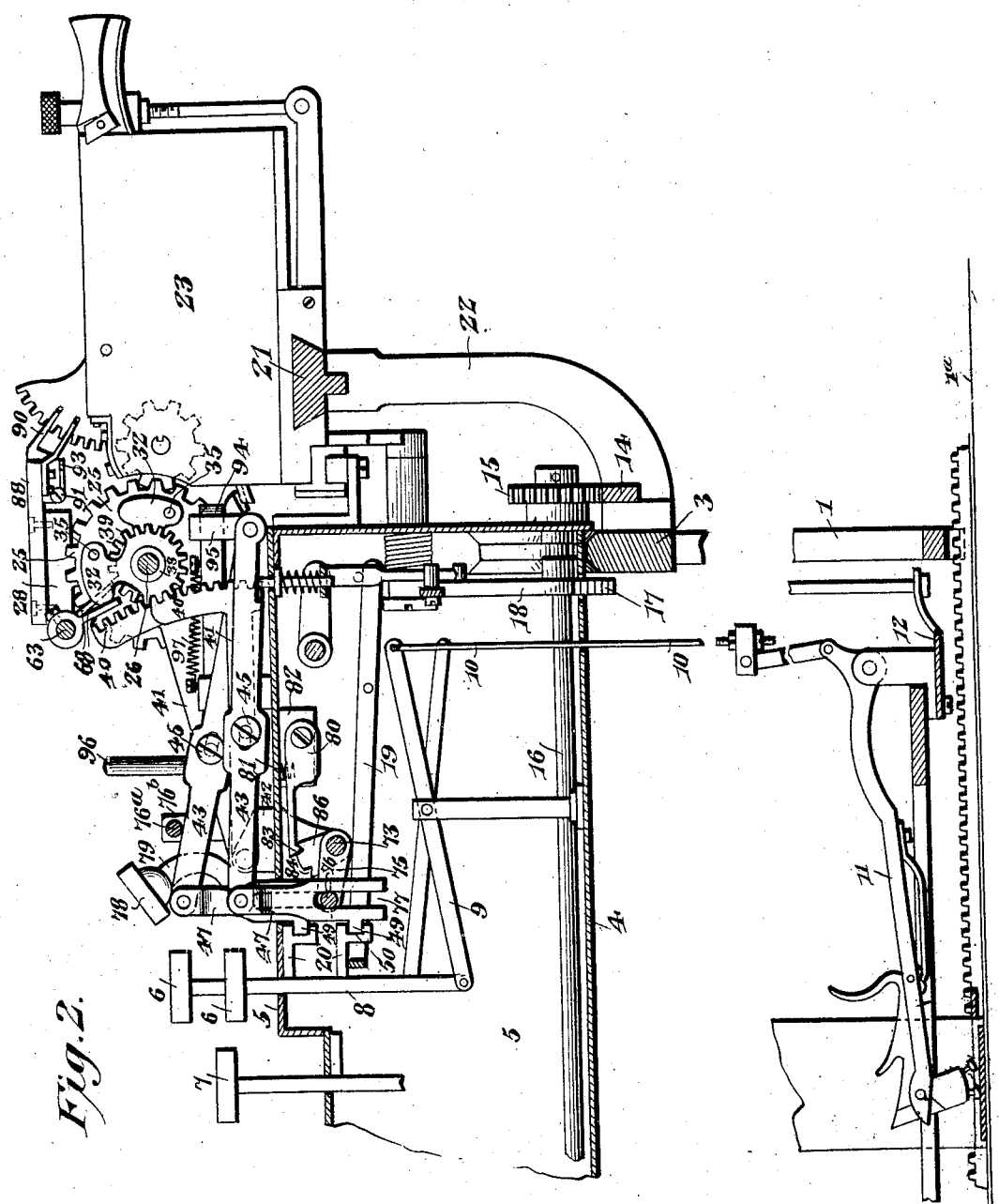

No. 829,971. PATENTED SEPT. 4, 1906.
C. F. LAGANKE & J. A. SMITH.
CALCULATING MACHINE.
APPLICATION FILED DEC. 22, 1904.
9 SHEETS—SHEET 3.
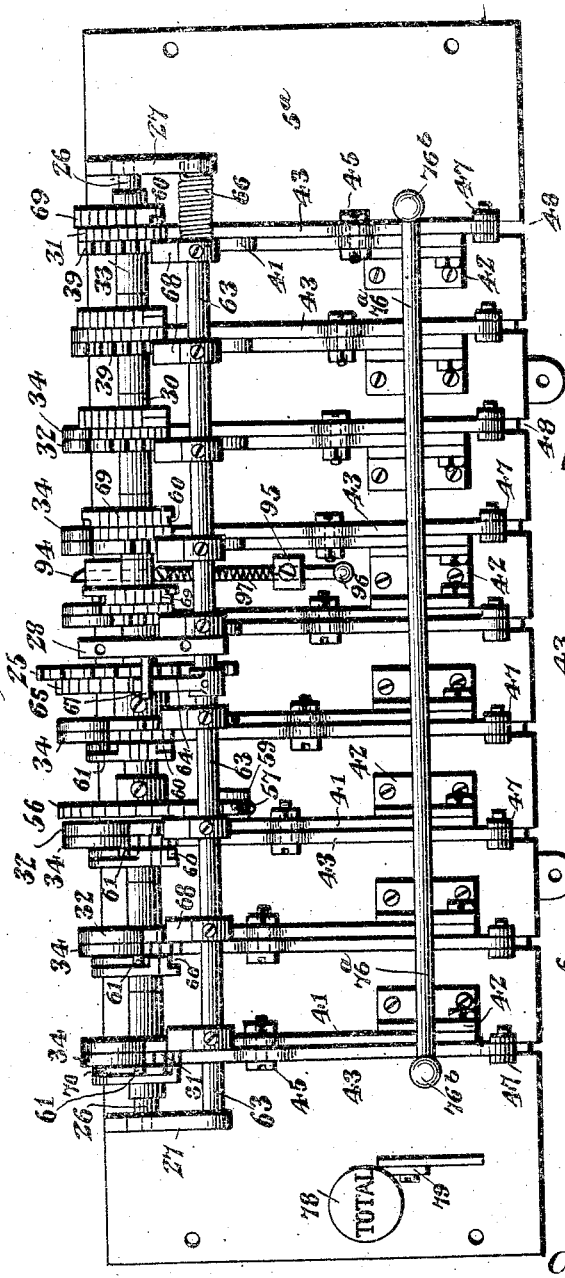
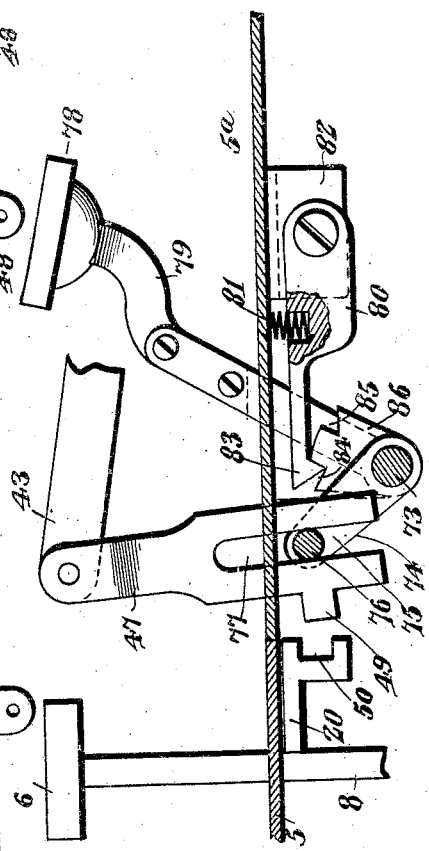
Witnesses
Jas. T. McCathran
Louis G. Julihn
Charles F. Laganke
John A. Smith  Inventors
By C. G. Siggers
Attorney No. 829,971. PATENTED SEPT. 4, 1906.
C. F. LAGANKE & J. A. SMITH.
CALCULATING MACHINE.
APPLICATION FILED DEC. 22, 1904.
9 SHEETS—SHEET 4.
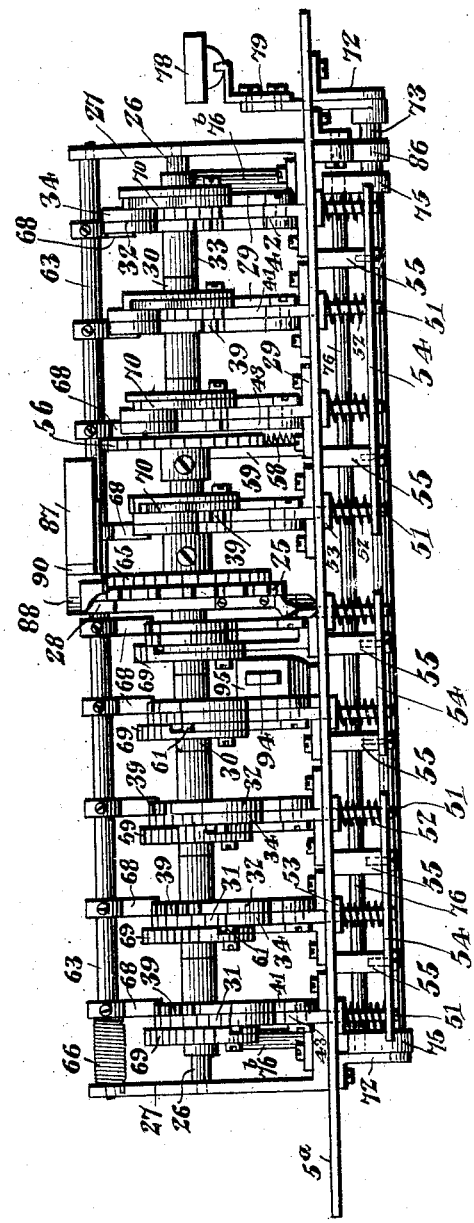
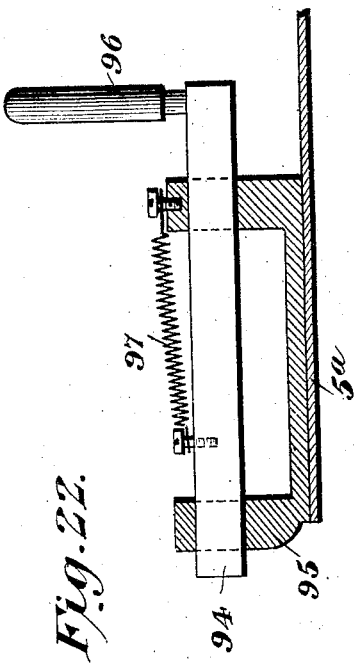
Witnesses
Jas. K. McCathran
Louis G. Julihn
Charles F. Laganke,
John A. Smith, Inventors
By E. G. Siggers
Attorney

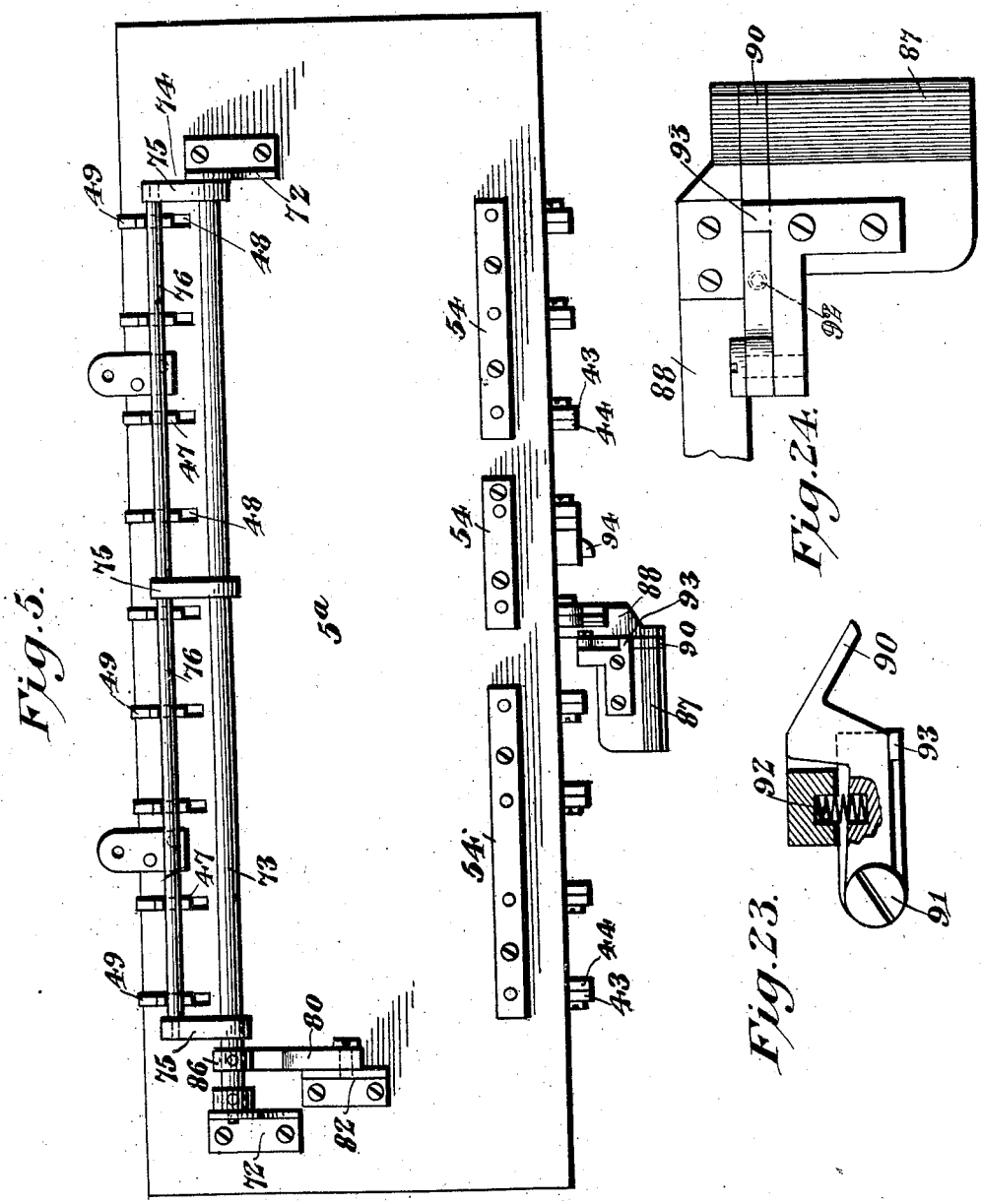

No. 829,971. PATENTED SEPT. 4, 1906.
C. F. LAGANKE & J. A. SMITH.
CALCULATING MACHINE.
APPLICATION FILED DEC. 22, 1904.

9 SHEETS—SHEET 6.

Witnesses
Jas. K. McCathran
Louis Julihn

Inventors
Charles F. Laganke
John A. Smith

By C. G. Siggers
Attorney

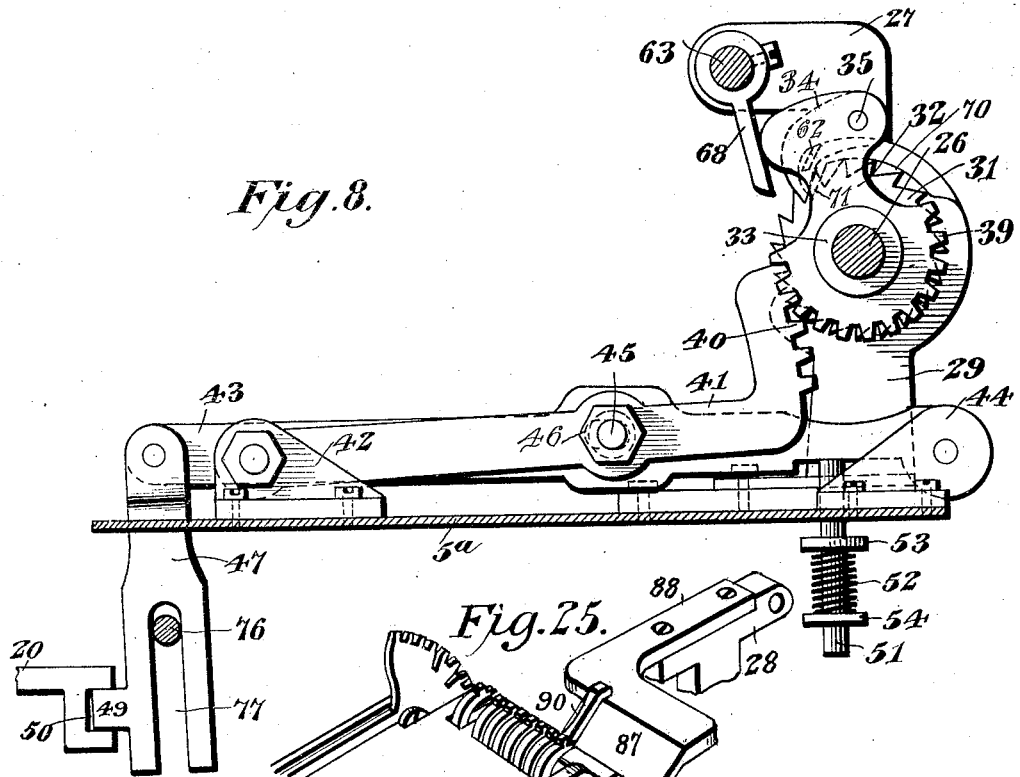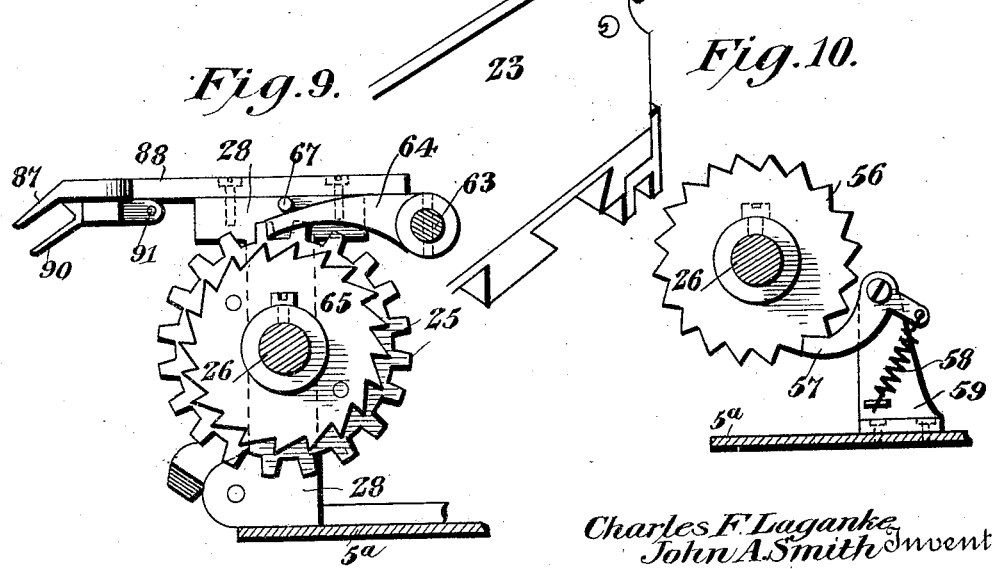

No. 829,971. PATENTED SEPT. 4, 1906.
C. F. LAGANKE & J. A. SMITH.
CALCULATING MACHINE.
APPLICATION FILED DEC. 22, 1904.
9 SHEETS—SHEET 8.
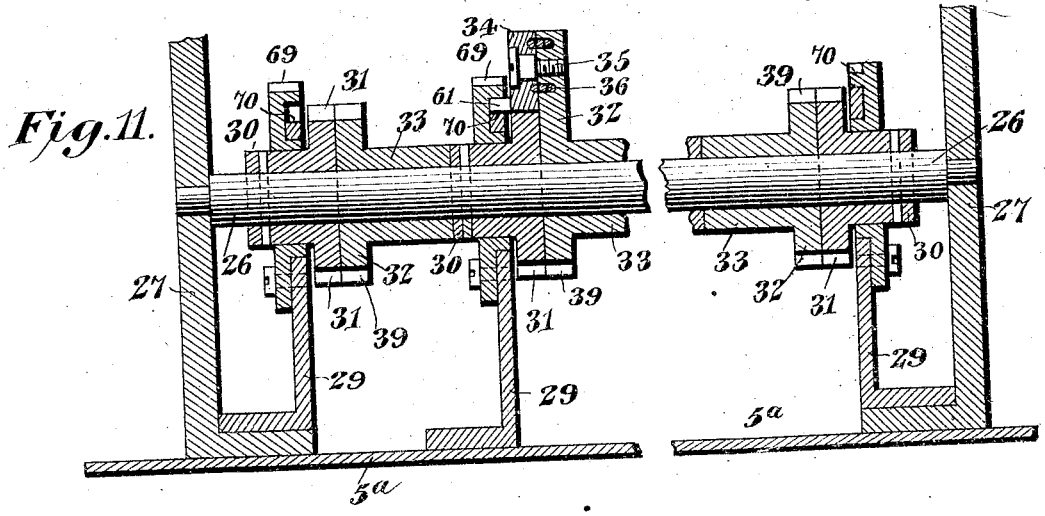
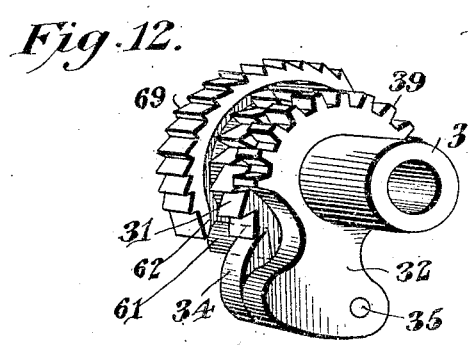
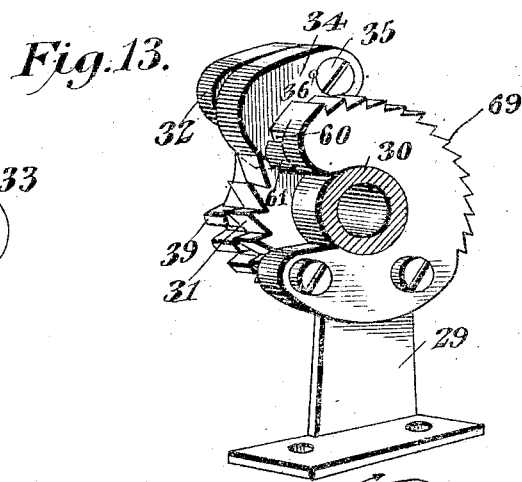
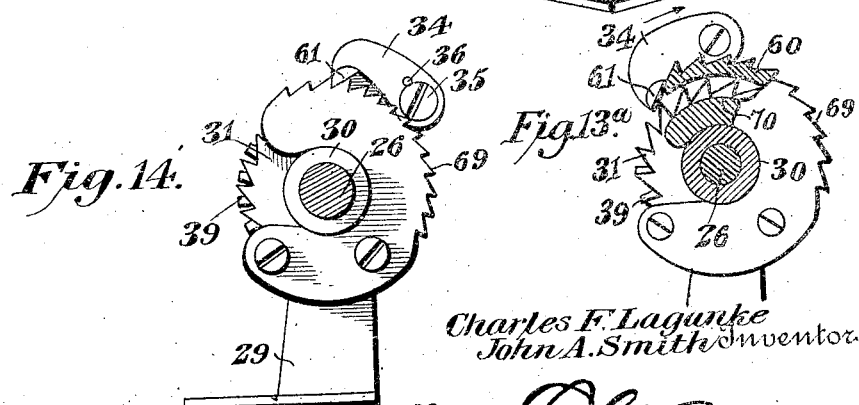
Charles F. Laganke
John A. Smith, Inventors
Witnesses
Jas. K. McCathran
Louis G. Julihn
By
Attorney No. 829,971. PATENTED SEPT. 4, 1906.
C. F. LAGANKE & J. A. SMITH.
CALCULATING MACHINE.
APPLICATION FILED DEC. 22, 1904.

9 SHEETS—SHEET 9.

Charles F. Laganke
John A. Smith, Inventors

Witnesses
Jas. F. McCathran
Louis G. Julihn

By C. G. Siggers
Attorney

UNITED STATES PATENT OFFICE.

CHARLES FREDERICK LAGANKE AND JOHN ASBURY SMITH, OF CLEVELAND, OHIO, ASSIGNORS TO ELLIOTT-FISHER COMPANY, OF NEW YORK, N. Y., A CORPORATION OF DELAWARE.

CALCULATING-MACHINE.

No. 829,971.        Specification of Letters Patent.        Patented Sept. 4, 1906.

Application filed December 22, 1904. Serial No. 237,957.

*To all whom it may concern:*

Be it known that we, CHARLES FREDERICK LAGANKE and JOHN ASBURY SMITH, citizens of the United States, residing at Cleveland, in the county of Cuyahoga and State of Ohio, have invented a new and useful Calculating-Machine, of which the following is a specification.

This invention relates to calculating-machines, and more particularly to that type which includes a type-writer as an adjunctive organization.

Viewed in a more specific aspect, the invention relates to a combined calculating-machine and book type-writer.

First. The object of the invention, stated generally, is to provide a compact, durable, positively-operating, and easily-accessible mechanism for connecting the numeral-keys of the type-writer with the computing device or register.

Second. Another object is to facilitate the rapid manipulation of the keys by providing independently-retractile connections between the several keys and the intermittently-rotary master-wheel or actuator of the computing device in order that any key may be depressed to properly operate the master-wheel without awaiting the complete retraction of a key previously depressed. This end is attained by mounting the actuator on a shaft having intermittent rotary movement in one direction only imparted thereto by any one of a series of oscillatory arms mounted on the shaft independently of each other and provided with pawls, which engage ratchets fixed on the shaft, so that when any arm is swung in the proper direction its pawl will engage a ratchet, and thus rotate the shaft and the actuator. The retraction of the arm is independent of the shaft, because the pawl will move idly over the tooth of the fixed ratchet. Therefore during such retraction of one arm another arm may be moved to again rotate the shaft and actuator in the same direction as before. Each of these oscillatory arms is actuated by one of the numeral-keys of the type-writer, and the extent of such movement corresponds to the value of the digit represented by the key.

Third. Another object is to avoid the possibility of error in the computation due to what is known as "doubling up"—to wit, the partial rotation of the actuator by a partial depression of a key when the latter is struck too light a blow by the operator and the further rotation of the actuator by a full stroke of the same key after the connections incompletely operated have been retracted. To this end provision is made for dogging each key connection and incidentally each key against retraction until a full stroke is completed. Thus if a false key-stroke is made the operator will be apprised of that fact by the failure of the key to rise, and upon striking it a second time the effect will be to merely complete the proper movement of the actuator.

Fourth. Another object is to eliminate error due to the overrunning of the actuator or master-wheel—that is to say, an exaggerated movement thereof in consequence of the momentum gained during its proper movement. This end is attained by associating with the master-wheel a ratchet engaged by a check-arm just as the master-wheel reaches the limit of its proper movement. The check-arm extends from a universal check-bar having arms, one for each key connection, and so arranged that any one of the several swinging arms mounted on the actuator-shaft will at the completion of its movement engage an arm on the check-bar, and thus rock the latter to shift the check-arm into engagement with the ratchet, and thus check the rotary movement of the master-wheel or actuator at the proper point.

Fifth. Another object is to eliminate the possibility of error consequent upon the redepression of a key before its connections have been completely retracted from a previous operating movement. This end is attained by providing means for dogging the key connection against movement in a direction to operate the actuator in case the key is struck before the connection has reached its completely-retracted position. To this end each of the pawls which engage the fixed ratchet-wheels on the actuator-shaft to rotate the latter is provided with a lateral projection or dog. This dog during its retractile movement travels idly over a ratchet-segment; but if during such movement the key is struck the dog will engage a tooth of the ratchet, and thus prevent the depression of the key, which would otherwise obviously result in an incomplete movement of the actuator.

Sixth. Another object is to provide positive means depending in no way upon the reaction of a spring or springs for keeping any driving-pawl in engagement with its fixed ratchet-wheel on the actuator-shaft during the entire key-stroke to insure the communication of a proper movement to the actuator during such key-stroke. This result is secured by providing a segmental guard-flange concentric with each driving-ratchet and disposed over the lateral projection or dog of the adjacent driving-pawl, thus positively preventing the pawl from moving out of engagement with the ratchet until the end of its stroke is reached.

Seventh. Another object of the invention is to produce an efficient form of key connection which may be utilized to transmit differential movement from the various keys to the swinging driving-arms on the actuator-shaft, notwithstanding the fact that the strokes of all the keys are uniform and that motion is transmitted during the entire stroke of each key. To effect this end, the connection between each key and the corresponding driving-arm includes two levers of the second and third class, respectively, fulcrumed at their opposite ends. These levers are provided intermediate of their ends with a combined sliding and pivotal connection constituting the load or resistance-point of one and the power-point of the other. The free end of the second-class lever has a link connection with the appropiate key, and the opposite end of the third-class lever is formed with a segmental rack meshing with a gear formed on the hub of the adjacent driving-arm. To effect the necessary variation in the extent of the transmitted movement, the connections between the levers of the several pairs are disposed in graduated arrangement.

Eighth. Another object is to provide a simple and efficient means for entirely disconnecting the key connections of the computing device from the keys of the type-writer to permit the unrestricted independent use of the latter. This mechanism comprehends a total-key arranged to actuate a swinging yoke, which when moved in one direction by the depression of the total-key causes the several links which connect the key-stems with the second-class levers to be withdrawn from operative proximity to said stems, thus permitting the keys to be operated—as, for instance, to print the total—without effecting the actuation of the computing device.

Other objects subordinate to those enumerated and structural features in addition to those particularly pointed out will appear more fully hereinafter, and the invention in its various aspects will be succinctly defined in the appended claims.

Figure 7:
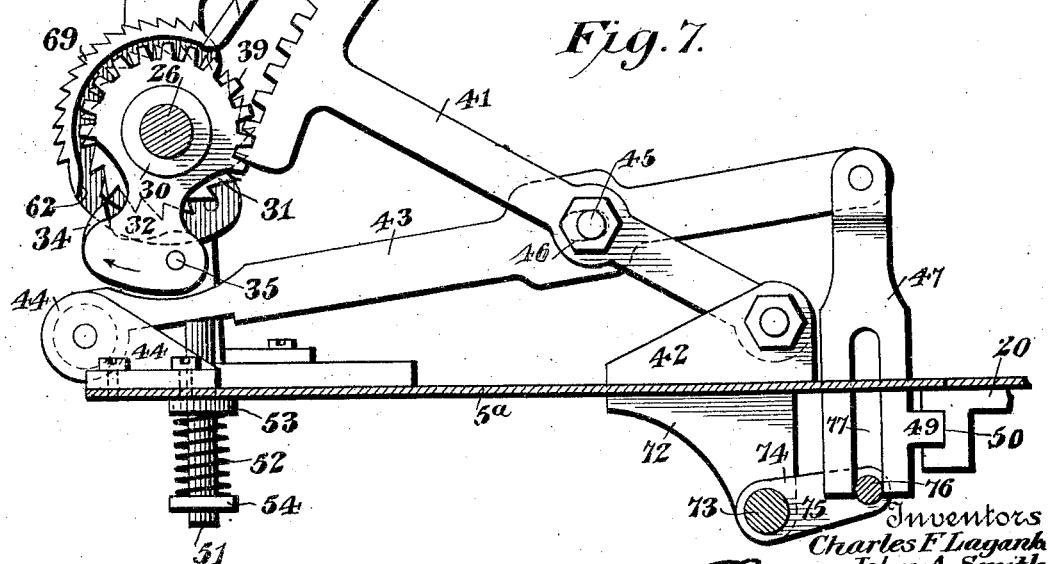
Figure 15:
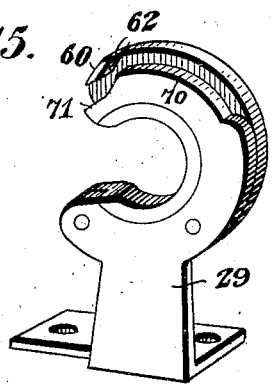
Figure 16:
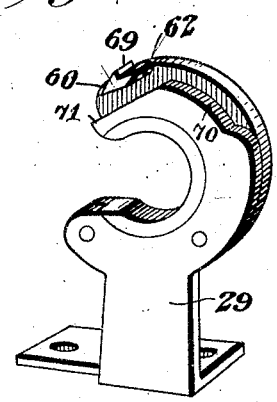
Figure 17:
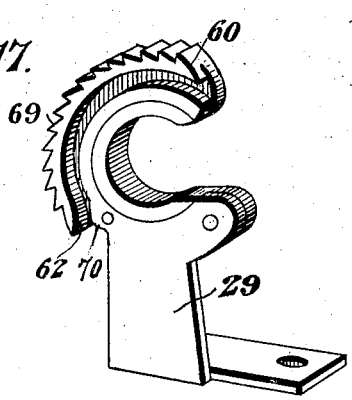
Figure 18:
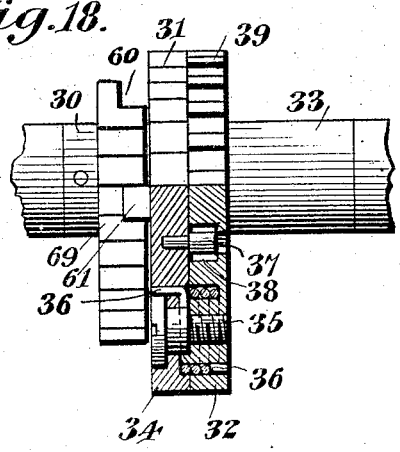
Figure 19:
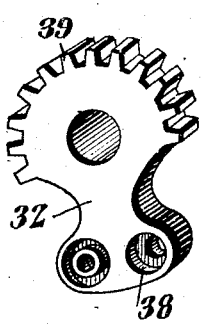
Figure 20:
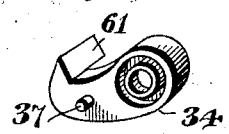

In the accompanying drawings, Figure 1 is a plan view of a book type-writer equipped in accordance with our invention. Fig. 2 is a vertical longitudinal sectional view of the same subject-matter. Fig. 3 is a plan view of the cover-plate of the type-writer detached and showing in plan the mechanism assembled thereon. Fig. 4 is a rear elevation of the subject-matter of Fig. 3. Fig. 5 is a bottom plan view of the cover-plate and attached parts. Fig. 6 is an enlarged sectional view showing the connecting mechanism between one of the keys and the actuator-shaft. Fig. 7 is a similar view of the connecting mechanism for another key. Fig. 8 is still another sectional view, but showing the subject-matter of Fig. 6 viewed from the opposite side and showing the positions assumed by the parts when the key is depressed. Fig. 9 is an enlarged section showing the arrangement of the actuator and the check-arm and ratchet. Fig. 10 is a similar view of the mechanism for resisting reverse rotation of the actuator-shaft. Fig. 11 is a sectional view on the line of the actuator-shaft with parts broken away and designed to show the arrangement of the bearing-brackets, driving-ratchets, and driving-arms. Fig. 12 is a detail perspective view showing the relation of a driving-arm and its ratchet with respect to the adjacent combination ratchet, guard-flange, and cam at the beginning of the driving movement of the arm. Fig. 13 is a perspective view of the same subject-matter viewed from the other side and showing a driving-arm at or about the end of its driving movement. Fig. 13ᵃ is a detail view showing the manner in which the retractile movement of the driving-arm causes the beak of its pawl to ride up the inclined face of a ratchet-tooth to present the projection of said pawl above the guard-flange. Fig. 14 is a detail elevation showing the manner in which the lateral projection or check-dog of a driving-pawl rides over the ratchet-flange, which prevents the driving-arm from being again operated before completing its retractile movement. Fig. 15 is a perspective view of the bearing-bracket associated with the connections of the "1" key. Fig. 16 is a similar view of the bracket associated with the connections of the "2" key. Fig. 17 is a perspective view of the bracket associated with the "9" key. Fig. 18 is a detail sectional plan showing the manner of connection between a driving-pawl and a driving-arm, the means for limiting their relative movement, and the manner in which the pawl coöperates with the ratchet-flange. Fig. 19 is a detail view of a driving-arm. Fig. 20 is a similar view of a driving-pawl. Fig. 21 is a detail sectional elevation of the total-key and associated parts. Fig. 22 is a detail view of the locating-stop for the computing device. Figs. 23 and 24 are detail views of the locator-depressing plate, and Fig. 25 is a perspective view showing the manner in which the movable section 90 of the depressing-arm yields when struck by a rising transfer-lever during the retraction of the carriage.

Each part is designated by the same reference character throughout the views.

While this invention may be viewed as a calculating-machine, since the operating mechanism for the computing device is possessed of special utility regardless of any other function which such mechanism may perform the illustrated embodiment of the invention is a combined type-writing and calculating machine, the numeral-keys of the type-writer serving both to operate the computing device and to simultaneously cause the printing of the digits included in the computation. For the purpose of this disclosure we have selected a type-writing machine of that type which are known as "flat-platen" or "book" type-writers, the particular machine selected for illustrative purposes being what is known commercially as an "Elliott-Fisher" type-writer, exemplified in Patent No. 573,868 to R. J. Fisher, to which reference may be made for a more complete disclosure of the type-writer than is thought to be necessary in the present connection.

*The general organization of the type-writer.*—The type-writer here shown embodies a machine-frame 1, mounted to travel longitudinally of a flat platen 1ª to space the lines of writing. The frame 1 includes front and rear carriage-guides 2 and 3, which slidably support a carriage 4, supporting the printing mechanism and movable transversely of the platen to letter-space the writing. The upper portion of the carriage 4 is in the form of a casing 5, above which are spaced the numeral and letter keys 6 and 7, having stems 8, connected at their inner ends to key-levers 9, fulcrumed within the carriage-casing 5. The key-levers 9 are connected through draw-wires 10 with downwardly-swinging type-bars 11, carried by a type-ring 12, pendent from the carriage-casing. (See Fig. 2.) The carriage 4 is moved to the right by carriage-propelling mechanism including carriage-tapes 13, connected at their inner ends to the carriage and at their outer ends to spring-drums (not shown) mounted on the machine-frame. The step-by-step advance of the carriage in the direction of letter-spacing is controlled by carriage-feeding mechanism including racks 14, associated with the carriage-guides 2 and 3 and meshing with pinions 15, fixed to the feed-spindle 16, extending transversely of the carriage and carrying the escapement-wheel 17. (See Fig. 2.) The wheel 17 is alternately engaged by the escapement-dogs 18, one of which is shown in Fig. 2. The escapement, including the ratchet escapement-wheel 17 and the dogs 18, is operated from the keys in a manner well understood in the art, and it is thought to be unnecessary to describe the operating connection further than to say that it includes a swinging key-yoke 19, mounted within the casing and arranged to be engaged and swung by any one of the several pins 20, which extend from the stems of the numeral-keys, as shown in Fig. 2. By this means the depression of a key to print a digit will cause the shifting of the escapement-dogs, and when the key is released the dogs will be permitted to shift back to their normal positions, and the carriage will simultaneously advance the distance of one letter-space to the right.

*The relation of the computing device to the type-writing machine.*—In rear of the machine-frame 1 a guide-bar 21 is supported in parallelism therewith by brackets 22. On the bar 21 is slidably supported a computing device or register 23, designed to be shifted along the bar and secured in position for use with respect to a column located at any point on the work-sheet supported by the platen. The device 23 includes a casing which contains the computing and registering mechanism, the specific character of which constitutes no part of the present invention. Suffice it to say that it includes, as usual, a series of digit-carriers or number-wheels designed to register hundredths, tenths, units, tens, hundreds, thousands, ten-thousands, hundred-thousands, and millions, the tenths-wheel being of double width to accommodate the decimal-space. Each of these wheels is provided upon its periphery with the digits "0" to "9," inclusive, preferably formed in or upon the end faces of the peripheral teeth, one digit of each wheel being observable through a sight-opening 24 at the upper front corner of the casing. Each digit-carrier or number-wheel is arranged to make nine-tenths of a complete rotation independently of the other wheels of the series to present its digits successively before the sight-opening and during its next or tenth increment of movement carries the next wheel to the left a single increment or step, after which the first-named wheel may again rotate independently for nine-tenths of a complete rotation before again advancing the adjacent wheel at the left a single step. Since the wheels of the entire series are related to one another in the manner stated, it follows that mechanical computations in addition may be effected by moving the wheels corresponding in order or denomination to the order of the digits composing the numbers to be added a number of increments corresponding to the unitary values of such digits. Thus suppose it is desired to add "23" and "32." The ciphers of all the wheels being disposed opposite the sight-opening, the tens-wheel will be moved two increments, presenting the digit "2" to view. The units-wheel will then be rotated three increments, and the number "23" will be observable through the sight-opening. The second number "32" will now be added by imparting to the tens-wheel three additional increments of movement and to the units-wheel two additional increments, thus causing the numerals presented before the sight-opening to read "55," the sum of the two numbers. Since the numerical value of each order or denomination of the column is ten, and since each wheel during its last or tenth increment of movement will, as heretofore explained, impart a single increment of movement to the next adjacent wheel of higher order, it follows that when the number reaches the limit of the numerical value of a given order or denomination the rotation of the adjacent wheel to the left will effect the registration of a digit of the next higher order. For instance, assuming the first-order or unit wheel to be given nine increments of movement during the presentation of the digit "9" opposite the sight-opening, the next or tenth increment of movement will present the "0" on said wheel before the sight-opening and will simultaneously advance the next higher or tens wheel a single increment to present the digit "1" of the second order or denomination before the opening, the presentation of the two digits "0" and "1" in the first and second orders effecting the registration of the number "10."

*The master-wheel and its operating connections.*—Upon the carriage 4 of the type-writing machine is mounted that portion of the computing mechanism which constitutes the operating means for the computing device proper, which, as we have seen, is mounted on the machine-frame. The primary element of this actuating mechanism is a master-wheel 25 of considerably greater diameter than the number-wheels and presentable to the latter in succession by the step-by-step advance of the carriage in the direction of letter-spacing. The master-wheel is designed to rotate the number-wheels in proportion to the numerical value of the digits embraced by the computation. The master-wheel is key-operated and the operating-keys in the illustrated embodiment of the invention are the numeral-keys of the type-writer, although it is obvious that viewing the invention as a calculating-machine, regardless of the recording of the digits upon a work sheet or page, it is immaterial whether the keys perform any function other than the actuation of the master-wheel.

The master-wheel or actuator 25 (see particularly Figs. 2, 3, and 9) is fixedly mounted upon a comparatively long actuator-shaft 26, disposed parallel with the axes of the number-wheels and supported at its opposite ends by bearing-brackets 27 and intermediate thereof by a center bracket 28, the several brackets rising from the cover-plate 5ª of the carriage-casing 5. This shaft 26 is designed to be intermittently rotated in one direction exclusively, the degree of rotation corresponding to the value of the particular numeral-key from which the motion is transmitted. The several numeral-keys are each independently connected to the actuator-shaft by means of key connections, each of which is capable of transmitting movement to the shaft from a key while the connections of a key previously depressed are being retracted. In addition to the brackets 27 and 28 a series of additional bearing-brackets 29 are secured to the cover-plate 5ª and correspond in number with the numeral-keys. The upper portion of each bracket 29 surrounds and constitutes a bearing for the hub 30 of a driving-ratchet 31, fixed to the actuator-shaft. Immediately adjacent to each ratchet 31 is a comparatively short driving-arm 32, loosely mounted on the actuator-shaft and having a comparatively long hub 33, which preferably extends to the hub of the adjacent driving-ratchet. As shown in Fig. 11, the arrangement of these ratchets 31 and arms 32 is such that they alternate with each other upon the actuator-shaft, so that the driving-arms, while free to swing relative to the shaft, are retained against lateral movement longitudinally thereof. Each of the driving-arms is designed to move a different distance, since the movement of each corresponds in extent to the value of the key by means of which it is swung. These arms therefore have a graduated arrangement, as indicated in Figs. 3 and 4. At the outer end of each driving-arm 32 is mounted a swinging driving-pawl 34, which when the arm is swung in the direction of the arrow in Fig. 7 is designed to engage a tooth of the adjacent driving-ratchet 31, and thus establish an operative connection between the driving-arm and the actuator, so that the latter will be rotated a distance corresponding to the stroke of the arm. The pawl 34 is preferably mounted, as shown in Fig. 18, a pivot-screw 35 being passed through the pawl and secured into the outer end of the driving-arm. The width of the pawl is slightly less than the distance between the driving-arm and the adjacent bearing-bracket, between which it is urged by a spring 36 to engage the driving-ratchet.

The spring 36 is preferably of spiral form and is located within a spring-pocket formed conjointly in the driving-arm and pawl, as shown. For the purpose of limiting the swinging movement of the pawl the latter is provided with a laterally-projecting stop-pin 37, designed to play in the recess 38 in the arm 32. At the side of its axis opposite the pawl each driving-arm is formed with a toothed segment 39, engaged by a toothed segment 40, formed at one end of a third-class lever 41, fulcrumed at its opposite end in a bracket 42, secured to the cover-plate 5ª, adjacent to the front edge thereof, the fulcrums of the several levers 41 being preferably arranged in alinement. Each lever 41 is designed to be operated for the purpose of swinging its driving-arm by a second-class lever 43, fulcrumed at its rear end in a bearing-bracket 44, mounted at the rear edge of the plate 5ª. The levers 43 are connected at their front ends to the keys for actuation by the latter, and an operative connection between each pair of levers 41 and 43 is effected by means of a headed pin 45 extended laterally from the lever 41 and received within a comparatively short longitudinal slot 46 in the adjacent lever 43. In other words, a slot-and-pin connection is effected between each pair of levers at a point intermediate of their ends. As the stroke of each key, regardless of its value, is the same and since a positive connection is effected in a manner to be described between each key and one of the levers 43, it follows that each lever 43 will have the same extent of movement or stroke, and as it is necessary for the several levers 41 to have differential movement according to the varying values of the keys the several slot-and-pin connections are disposed in graduated arrangement, as best shown in Fig. 3—that is to say, the connection between the levers 41 and 43 of that pair or set which is included in the connection for the "1" key is located comparatively near the fulcrum of the lever 43 and a correspondingly great distance from the fulcrum of the lever 41. The slot-and-pin connection between the levers 41 and 43, operated by the "9" key, on the contrary, is comparatively close to the fulcrum of the lever 41 and correspondingly removed from the fulcrum of the lever 43. By this arrangement the stroke of the lever 41, operated by the "1" key, will be one-ninth of the stroke of the lever 41, operated by the "9" key, notwithstanding the fact that both of the levers 43, operated by the "1" and "9" keys, respectively, will have exactly the same stroke. In similar manner the location of the connections between the levers of intermediate pairs is graduated so that the movement of the actuator will correspond in extent to the value of the particular numeral-key depressed.

Pendent from the front end of each lever 43 is a link 47, extending through a slot 48 in the cover-plate 5ª and provided at a point below said plate with a projection 49 designed to normally engage the adjacent pin 20, projecting from the stem of a numeral-key. The pin 20 is preferably provided, as shown in Figs. 2, 6, and 7, with a recess 50 for the accommodation of the projection 49, so that a positive connection with the key will be effected in order that the key and its connections will move in unison during both the operating and retractile movements of the parts. When a key is depressed, a link 47 will be drawn down and the actuator-operating connections will thus be actuated to rotate the actuator or master wheel, the connections and key moving back to their initial positions in unison when released. To facilitate this retractile movement of the parts, a series of vertically-reciprocatory retracting-plungers 51 are extended upwardly through the plate 5ª, and each engages the under side of one of the levers 43 adjacent to the fulcrum thereof. (See Figs. 6 and 7.) Each plunger is constantly urged upwardly by a retracting-spring 52, located below the plate 5ª and bearing at its upper end against a collar 53, fixed on the plunger, and at its lower end against a fixed guide-plate 54, which serves to guide the lower end of the plunger and is retained in spaced relation to the plate 5ª by posts 55. (See Fig. 4.) The guide-plate 54 is preferably formed in separate sections, as shown. When a key is depressed, the driving-arm 32, connected thereto, will be swung in the direction of the arrow in Fig. 7, and its pawl engaging the adjacent fixed ratchet 31 will rotate the actuator-shaft and the master-wheel fixed thereon for the purpose of rotating that number-wheel with which the master-wheel is engaged a number of increments corresponding to the unitary value of the key. When the key is released, its connections will be retracted without effecting reverse rotation of the actuator-shaft, since it will be obvious that the driving-arm will swing back to its initial position independently of the ratchet previously engaged by its pawl.

The construction thus far described comprehends a complete embodiment of the invention so far as concerns the attainment of the first, second, and seventh objects recited in the introductory part of this specification. Obviously the arrangement is simple, compact, and positively operating, and is accessible for adjustment and repair, since the parts are all assembled upon a single cover-plate which may be readily detached from the remainder of the machine. Furthermore, it will be apparent that since each of the driving-arms is loosely mounted on the actuator-shaft and is retracted independently thereof the keys may be operated in rapid succession, since the connection of one key may be retracting while the independent connection of another key is imparting movement from said key to the actuator-shaft and the master-wheel. Also, as has been fully explained, the variation in location of the several slot-and-pin connections between the levers of the several pairs results in the differential movement of the master-wheel in accordance with the different values of the keys, notwithstanding the fact that the stroke of all the keys is the same and that motion is transmitted to the master-wheel throughout practically the entire stroke of each key.

*The means for preventing "doubling up" and for insuring proper engagement of the driving pawl and ratchet during the entire key stroke.*—The term "doubling up" is frequently used by those skilled in the art to describe the exaggerated or excessive movement of a number-wheel, resulting from a partial or false stroke of a key and a subsequent full stroke thereof. This will be clearly understood when it is explained that if the "6" key is partially depressed the master-wheel and consequently the number-wheel engaged thereby will move, say, three increments. If, after the retraction of the connections from this incomplete stroke, the operator, noting the failure of the carriage to feed, should strike the key again and fully depress it, six increments of movement would be imparted to the number-wheel, the result being the doubling up or addition of the three increments of movement resulting from the false key stroke and the six increments of movement resulting from the full stroke of the "6" key. This would obviously falsify the computation, and the possibility of such error must be avoided. To effect this result, it is simply necessary to dog each key connection against retraction until its full stroke has been completed, and this may be done by means of the following instrumentalities: Fixedly mounted on the actuator-shaft is a toothed check-wheel 56, engaged by a check-dog 57, urged toward the wheel by a spring 58 and mounted on a bracket 59, carried by the plate 5ª. (See Fig. 10.) The dog 57 resists reverse rotation of the actuator-shaft and of the master-wheel and driving-ratchets carried thereby. It is obvious, therefore, that as a driving-arm swings back during the retraction of a key it will not carry the adjacent driving-ratchet with it, even assuming for the moment that the pawl remains in engagement with the ratchet. Therefore in order to prevent the driving-arm from swinging back before it has completed a full forward stroke it is simply necessary to provide means for connecting the pawl and ratchet in a manner to resist such retractile movement. To attain this end, each of the bearing-brackets 29 is provided with a segmental guard-flange 60, concentric with the actuator-shaft. Under this guard-flange 60 a lateral projection or dog 61, projecting laterally from one side of the adjacent pawl 34, is designed to ride when a driving-arm is swung to operate the master-wheel. This flange 60 performs several functions. In the first place its rear extremity is reversely curved to form a cam 62, which will engage the dog 61 of the pawl and positively urge the latter into engagement with a tooth of the adjacent driving-ratchet 31 in the event of failure of the spring 36 to move the pawl to its engaging position at the proper time. After the engagement of the pawl with the ratchet has been effected the flange 60 constitutes a guard, positively preventing the accidental disengagement of the pawl from the ratchet until the full stroke is completed. It is by reason of this function of the flange 60 as a guard that it serves also to aid in preventing the retraction of the key connection from a false stroke of the key. As the guard-flange 60 occupies such a position that it prevents the pawl from moving out of engagement with the ratchet, it follows that when a key is partially depressed and then released the driving-arm 32 will not be retracted, since the pawl carried by said arm would necessarily have to ride back over the teeth of the ratchet 31, and this it is prevented from doing because the flange 60, engaging the projection or dog 61 on the pawl, will prevent the latter from swinging out sufficiently to clear the ends of the ratchet-teeth. Therefore, when the operator again strikes the key the movement of its connections will merely be completed, and exaggerated movement of the master-wheel, due to doubling up, will be prevented.

In the present embodiment of the invention the character of connection between the key and the elements of the operating connection of the computing device is such that the key is prevented from rising from an incomplete stroke. This is desirable because the failure of the key to rise attracts the operator's attention to the incomplete stroke if he should overlook the failure of the carriage to feed. This character of connection for the key is not essential, however, since it is obvious that even if the key is capable of rising from an incomplete stroke its connection would nevertheless be dogged against retraction and excessive movement of the actuator or master wheel would thus be prevented.

*The means for preventing overrunning of the master-wheel.*—Another possibility of error arises from the tendency of the master-wheel to overrun its proper movement in consequence of the impetus gained by it. It will be noted, for instance, that when the "9" key is depressed a movement of considerable extent will be imparted to the master-wheel at comparatively high speed, and to prevent the impetus thus gained from producing a slightly-exaggerated movement it is necessary to positively dog the master-wheel against further advance the instant it completes a movement corresponding in extent to the value of the key depressed.

The mechanism for preventing the overrunning of the master-wheel includes what may be termed a "universal" check-bar 63, afforded bearings in the forwardly-extended upper ends of the brackets 27 and 28. Extended rearwardly from this bar is the swinging check-arm 64, (see Figs. 3 and 9,) designed to be moved into engagement with a ratchet-wheel 65, fixed to the actuator-shaft 26 and preferably also rigidly attached to one side of the master-wheel 25. Normally the check-arm 64 is held out of engagement with the ratchet-wheel 65 by a spring 66, (see Fig. 3,) encircling the universal bar 63, adjacent to one end thereof, and tending to rock the latter in one direction. To confine the movement of the check-arm 64 within narrow limits, it is arrested when moved out of engagement with the wheel 65 by a stop 67. (See Fig. 9.)

Extending radially from the universal bar 63 are a series of arms 68, each of which is arranged to be engaged by one of the driving-arms 32 as the latter reaches the limit of its movement. Thus when a key is depressed the driving-arm will swing for the purpose of rotating the master-wheel and immediately before said driving-arm reaches the limit of its movement it engages one of the arms 68 and swings the latter, as shown in Fig. 8, thereby rocking the universal check-bar 63 and swinging the check-arm 64 into engagement with the ratchet-wheel 65 to positively check the master-wheel at the proper point, and thus prevent overrunning thereof. As the driving-arm moves back upon the release of the key the spring 66 restores the check-bar to its normal position and withdraws the check-arm from engagement with the ratchet-wheel. Therefore as soon as the driving-arm has moved back the very slight distance necessary to effect the release of the master-wheel the latter may be operated by another key without awaiting further retractile movement of the key previously depressed.

*The means for preventing the redepression of a key before its connections have been completely retracted.* — The mechanisms described under the two immediately preceding headings are designed to eliminate the possibility of error due to excessive or exaggerated movement of the master-wheel. Under the present heading will be described the mechanism designed to eliminate error due to insufficient movement of the master-wheel. Suppose, for instance, that the "6" key is depressed, thus rotating the master-wheel six increments and effecting a corresponding operation of a number-wheel of the computing device. If now the key is released, the carriage will feed to present the master-wheel to another number-wheel of the computing device, and if immediately after its release the key is redepressed before its connections have had time to move back to their completely-retracted positions an insufficient movement will be imparted to the number-wheel because the effective key-stroke will only equal in extent the incomplete retractile movement of the connections. Thus under such conditions the number-wheel operated by the premature redepression of the "6" key would move only five increments or less, and the computation would be correspondingly erroneous. To avoid this possibility of error, provision is made for preventing reactuation of a key connection until the retractile movement of the latter from a previous operation has been completed. By reference to Fig. 7 it will be seen that the outer side of each guard-flange 60 is formed with ratchet-teeth 69. When a driving-arm reaches the limit of its operating movement, the projection or dog 61 on its pawl will have passed beyond the front end of the flange 60, and as the arm begins its retractile movement the beak of its pawl will necessarily ride up the inclined face of the tooth in rear of the one engaged by it, and this outward movement of the pawl will cause the dog or projection 61 to ride up over the front end of the flange 60. As the driving-arm now moves back the projection 61 instead of traversing the under side of the flange, as before, will ride over the flange, being urged toward the latter by the spring 36. In consequence of this arrangement it is apparent that an attempt to prematurely redepress the key would be rendered ineffective by reason of the engagement of the dog 61 with one of the teeth 69 on the flange 60. As soon, however, as the parts are completely retracted the dog 61 will ride off of the rear end of the flange 60 and will drop upon the surface of a cam 70, which will retain it out of engagement with the teeth of the driving-ratchet. If now the driving-arm is again advanced to operate the master-wheel, the projection 61 of its pawl will move along the cam-face 70 until it reaches the cam end 62 of the flange 60. At this point the face of the cam 70 is depressed, as indicated at 71 in Fig. 15, in order that the dog may ride down under the flange 60, and thus insure the engagement of the pawl with the driving-ratchet. It will of course be understood that while all of these structural characteristics are common to the several operating connections they vary in dimensions in accordance with the varying strokes of the several driving-arms.

*The means for disconnecting the numeral-keys of the type-writer from the master-wheel-operating connections to permit the unrestricted independent use of the type-writer.*—Pendent from the under side of the cover-plate 5ᵃ, adjacent to the front edge thereof, are a pair of bearing-brackets 72, in which is journaled a rock-shaft 73, carrying a yoke 74, comprising a pair of arms 75, extending radially from the shaft 73 and connected by a universal bar 76, disposed parallel with the shaft. The universal bar 76 is received within vertical slots 77 in each of the several links 47. The slots 77 are of sufficient length to accommodate the normally stationary universal bar when the links 47 are reciprocated vertically during the operation of the key connections, said bar thus serving to guide the links in their movement. In addition to its function as a guide the universal bar 76 is designed to be shifted laterally from its normal position (shown in Fig. 7) for the purpose of swinging the several links 47 to disengage the several lugs 49 from the pins 20 on the key-stems, thus disengaging the operating connections of the computing device from the numeral-keys of the type-writer. This lateral movement of the universal bar 76 is effected by the depression of a total-key 78, the stem 79 of which extends through a slot in the plate 5ª and is connected at its lower end to the shaft 73. When the total-key 78 is depressed or pushed back, the shaft 73 and the yoke carried thereby is rocked, thus causing the universal bar 76 to withdraw the several links 47 from engagement with the key-stems, undue upward movement of the connections when thus released being prevented by the universal stop-bar 76ª, disposed across the front ends of the levers 43 and supported by standards 76ᵇ, rising from the plate 5ª. Similarly the movement of the total-key in the opposite direction restores the connections between the numeral-keys and the computing device. To retain the total-key and its associated parts in either position, a pivoted detent 80, urged downwardly by a spring 81, is mounted on a bracket 82, depending from the plate 5ª, and is provided with a beak 83, which engages either of a pair of notches 84 or 85 in an arm 86, secured to the shaft 73. The opposite faces of the beak 83 are inclined, as shown, so that while the total-key is retained in either of its positions the detent will yield to permit the movement of the key under the application of ordinary pressure thereto.

A subordinate feature of the invention relates to an improvement in the specific construction of the depressing-arm for the transfer-levers of the computing device.

In this class of calculating-machines a computing device having transfer-levers extended above the casing thereof has been employed, and a lever-depressing plate movable with the carriage of the type-writer has been utilized to depress the levers slightly for the purpose of preventing accidental carrying of a wheel when the wheel of next lower order is brought to rest in the "9" position. These transfer-levers are depressed during the operation of the machine and are automatically released as the carriage is retracted. This mechanism is not part of the present invention and is not specifically illustrated or described herein. It is thought to be sufficient in this connection to state that the automatic release of the transfer-levers is sometimes effected before the depressing-arm is entirely removed from a position over a last lever, and the upward movement of the latter is thus obstructed. To avoid any possible objectionable result from this interference the extended rear edge 87 of the transfer-lever depressing-arm 88, which is carried by the bracket 28, is provided at the right-hand end thereof with a vertically-movable section 90, having the general form of a swinging tooth pivoted at 91 and urged to its normal position by a spring 92, where it is arrested by a stop 93. This movable section of the arm represents that portion with which the interference occurs, and since it is capable of limited upward movement it yields when struck by the ascending transfer-lever, and as it is at the same time moving away from the lever with the retracting-carriage the lever is entirely released before the interference causes a locking of the parts.

94 indicates a sliding computing-device locator mounted in bearings 95 on the cover-plate 5ª and designed to be urged rearwardly by a handle 96 for the purpose of disposing it in position to arrest the computing device at the proper point as the latter is moved along the bar 21 to a position opposite the desired column. The locator 94 is retracted by a spring 97, as shown in Fig. 22.

It is thought that the foregoing description of the construction and operation of our calculating-machine is sufficient for the purpose of this disclosure. It is apparent, however, that various features of the invention may be used in other relations or embodied in other specific structures. It should therefore be distinctly understood that we reserve the right to effect such changes, modifications, and variations of the illustrated structure as may come fairly within the scope of the protection prayed.

What we claim is—

1. The combination with a computing device, a rotary actuator therefor, and an actuator-shaft, of a series of driving-arms mounted to swing from the shaft and to rotate the same in one direction only, a series of keys, and an independent system of levers between each key and a driving-arm.

2. The combination with a computing device, a rotary actuator therefor, and an actuator-shaft, of a series of driving-arms for said shaft, a series of keys, a series of second-class levers each operated by a key, and a series of third-class levers each operated by a second-class lever and geared to a driving-arm.

3. The combination with a computing device, a rotary actuator and an actuator-shaft, of a series of driving-arms each constituting a first-class lever and arranged to rotate the shaft in one direction only, a series of keys, and an operating connection between each key and a driving-arm, each of said connections including levers of the second and third class.

4. The combination with a computing device, an actuator therefor, and an actuator-shaft, of a plurality of keys, and a separate independent connection between each key and the actuator-shaft, said connection including levers of the first, second and third classes.

5. The combination with a computing device, a rotary actuator therefor, and an actuator-shaft, of a plurality of keys, and a separate independent connection between each key and the shaft, each connection including a driving-arm mounted to swing from the shaft, pawl-and-ratchet mechanism for connecting one end of the arm with the shaft, a toothed segment at the opposite end of the arm, and gearing engaging said segment and operated by a key.

6. The combination with a computing device, a rotary actuator therefor, and an actuator-shaft, of a plurality of keys, and an independent operating connection between each key and the shaft, each connection including a driving-arm mounted to swing from the shaft, a toothed segment at one side of the axis of said arm, pawl-and-ratchet mechanism for connecting the arm at the opposite side of its axis with the shaft, and a lever operated by a key and having a toothed segment meshing with the segment of the driving-arm.

7. The combination with a computing device, a rotary actuator therefor, and an actuator-shaft, of a plurality of keys, and an independent operating connection between each key of the shaft, each of said connections including a driving-arm mounted to swing from the shaft and having pawl-and-ratchet connection therewith, levers of the second and third class fulcrumed at their opposite ends and having operative connection intermediate of their ends, the free end of the second-class lever having operative connection with the key and the free end of the third-class lever being geared to the driving-arm.

8. The combination with a computing device, a rotary actuator therefor, and an actuator-shaft, of a series of keys, and an independent connection between each key and the shaft, each of said connections including a driving-arm mounted to swing from the shaft, pawl-and-ratchet mechanism for connecting one end of the driving-arm with the shaft, a toothed segment located at the opposite side of the axis of the driving-arm, a third-class lever having a toothed segment geared to the segment of the driving-arm, and a second-class lever connected to the third-class lever to operate the same and operated by a key.

9. The combination with a computing device, a rotary actuator therefor, and an actuator-shaft, of a series of keys, a series of driving-arms for the shaft, and a series of pairs of levers connecting the keys with the driving-arms, the levers of each pair being fulcrumed at their opposite ends and having operative connection intermediate of their ends, the lever connections of the several pairs having graduated arrangement.

10. The combination with a computing device, a rotary actuator therefor, and an actuator-shaft, of a series of keys, a series of driving-arms for the shaft, a series of third-class levers geared to the driving-arms and having their fulcrums alined, and a series of second-class levers likewise having their fulcrums alined and arranged to be operated by the keys, and means located at graduated distances from the fulcrums of the levers for connecting each lever of the second class with a lever of the third class.

11. The combination with a computing device and a rotary actuator therefor, of a plurality of keys, a traveling carriage and a separate, independent operating connection between each key and the actuator and mounted on the carriage, the retraction of each connection being independent of the actuator to permit the operation of the latter by one connection while another is being retracted.

12. The combination with a computing device, a plurality of keys, and a traveling carriage, of an actuator movable with the carriage, an actuator-shaft, and an independent connection between each key and the actuator-shaft, each connection including a driving-arm mounted to swing from the shaft and pawl-and-ratchet mechanism for connecting the driving-arm with the shaft when moved in one direction.

13. The combination with a computing device, a series of keys, and a traveling carriage, of a rotary actuator and its shaft mounted on the carriage for movement therewith, and an independent operating connection between each key and the shaft, each connection including a driving-arm arranged to rotate the shaft in one direction, and a system of levers mounted on and movable with the carriage and arranged to transmit motion from a key to the driving-arm.

14. The combination with a computing device, a series of keys, and a traveling carriage, of an actuator for the computing device, an actuator-shaft mounted on the carriage, a series of driving-arms mounted to swing from the shaft, pawl-and-ratchet mechanism for independently connecting either driving-arm with the shaft, a series of third-class levers mounted on the carriage and each geared to a driving-arm, and a series of second-class levers each connected to one of the third-class levers and arranged to be operated by a key.

15. The combination with a computing device, an actuator therefor, an actuator-shaft, and a traveling carriage, of a plurality of keys movable with the carriage, and an independent operating connection between each key and the actuator-shaft, each of said connections being capable of retraction independently of the shaft to permit the operation of the actuator by one connection during the retraction of another.

16. The combination with a computing device, its actuator, an actuator-shaft, and a traveling carriage, of keys movable with the carriage, driving-arms mounted on the shaft, and a system of levers comprising independent sets mounted on the carriage and connecting each key with a driving-arm.

17. The combination with a computing device, its actuator, and a traveling carriage, of keys movable with the carriage, independent driving-arms for the actuator, and independent systems of levers each connecting a key with a driving-arm, each system of levers including levers of the first and second class fulcrumed at their opposite ends upon the carriage and operatively connected.

18. The combination with a computing device, a traveling carriage, and keys, of independent connections between the several keys and the actuator, said connections including a series of levers fulcrumed on the carriage and having connection at different distances from their respective fulcrums with the keys.

19. The combination with a computing device, an actuator therefor, and a traveling carriage, of keys each having the same stroke, a series of levers mounted on the carriage and operated by the keys, a second series of levers also mounted on the carriage and arranged to be moved in different degree by the respective levers of the first series, and an operating connection between each lever of the second series and the actuator of the computing device, each of said connections including an independent pawl-and-ratchet mechanism.

20. The combination with a traveling carriage, a computing device mounted independently thereof and including a series of digit-carriers, of a master-wheel shaft mounted on the carriage, a master-wheel mounted on the shaft to be rotated thereby and movable to successive digit-carriers as the carriage advances, a series of keys also mounted on the carriage, and an independent operating connection between each key and the master-wheel shaft, said connection including a first-class lever constituting a driving-arm mounted on the master-wheel shaft and having pawl-and-ratchet connection therewith when moved in one direction, a lever of the second class disposed to be operated by the key, and a lever of the third class operated by the lever of the second class and arranged to operate the lever of the first class.

21. The combination with a computing device, an actuator therefor, and a series of keys, of a traveling carriage having a detachable cover-plate, and a plurality of operating connections independent of each other and mounted on the cover-plate to transmit movement from the respective keys to the actuator.

22. The combination with a computing device, a series of keys, and a traveling carriage having a detachable cover-plate, of an actuator-shaft mounted on the upper side of the cover-plate, an actuator mounted on the said shaft, and a series of independent operating connections likewise mounted upon the upper side of the cover-plate to transmit motion from each key to the actuator-shaft, each of said connections including a driving-arm mounted on the shaft and having pawl-and-ratchet connection therewith, and a set of levers for operating the driving-arm.

23. The combination with a computing device, including a series of digit-carriers and a traveling carriage, of an actuator-shaft and a series of keys both mounted on the carriage for movement therewith, an actuator on the shaft, and an independent operating connection between each key and the shaft, each of said connections including a driving-arm mounted on the shaft and having pawl-and-ratchet connection therewith, and a set of levers for transmitting motion from the key to a driving-arm.

24. The combination with a type-writing machine, including printing mechanism and numeral-keys, of a computing device, an actuator therefor, and a separate independent operating connection between each key and the actuator, each connection being capable of operating the actuator during the retraction of another connection, whereby it is possible to properly operate the computing device by the depression of a key before the operating connection of a key previously depressed has been restored to its normal position.

25. The combination with a type-writing machine, including traveling printing mechanism and numeral-keys, of a computing device, a rotary actuator therefor, and a separate independently-retractile operating connection between each numeral-key and the actuator, whereby said actuator may be operated by one key before the operating connections of a key previously depressed have been fully retracted.

26. The combination with a type-writing machine, including a machine-frame, a traveling carriage, and printing mechanism and numeral-keys movable with the carriage, of a computing device mounted on the frame, an actuator therefor mounted on the carriage, and a separate independent operating-connection between each key and the actuator, the arrangement of said connections being such that the actuator may be operated by a key during the retraction of the connections of a key previously depressed.

27. The combination with a type-writing machine, including a machine-frame, a traveling carriage thereon, and printing mechanism and numeral-keys mounted on the carriage, of a computing device mounted on the frame, an actuator-shaft mounted on the carriage, an actuator on the shaft and operatively related to the computing device, a series of driving-arms having pawl-and-ratchet connection with the actuator-shaft, and means for operatively connecting each of the numeral-keys with a driving-arm.

28. The combination with a type-writing machine, including a machine-frame, a traveling carriage thereon, and printing mechanism and numeral-keys mounted on the carriage, of a computing device mounted on the frame, an actuator-shaft on the carriage, an actuator on the shaft, and separate independent connections between each of the numeral-keys and the shaft, each of said connections including a driving-arm mounted to swing from the actuator-shaft and having pawl-and-ratchet connection therewith, and a set of levers operatively connecting each driving-arm with a key.

29. The combination with a type-writing machine, including a machine-frame, a traveling carriage, and printing mechanism and numeral-keys mounted on the carriage, of a computing device mounted on the frame, an actuator-shaft on the carriage, an actuator on the shaft, a series of independent driving-arms mounted on the shaft and having pawl-and-ratchet connection therewith, a plurality of third-class levers each geared to one of the driving-arms, and a plurality of second-class levers each connected to one of the third-class levers to operate the same and arranged to be operated by a key.

30. The combination with a computing device and its actuator rotatable in one direction only, of a plurality of separate independent operating connections arranged to impart differential movement to the actuator and each capable of operation during the retraction of another connection, and means for dogging each of the several connections against retraction until its full operating movement is completed.

31. The combination with a computing device including a series of denominational members and a master-wheel presentable to successive members, of a series of keys, separate independent operating connections arranged to transmit a different degree of movement to the master-wheel from each key and each capable of being operated during the retraction of another connection, and means for preventing the retraction of any key and its connection prior to the completion of a full stroke.

32. The combination with a computing device and its actuator rotatable in one direction only, of an actuator-shaft, a series of driving-arms for said shaft, pawl-and-ratchet mechanism connecting each driving-arm with the shaft, and means for preventing the retraction of each driving-arm until its full stroke has been completed.

33. The combination with a computing device, its actuator, and an actuator-shaft, of means constantly opposing reverse rotation of the actuator-shaft, a series of independent driving-arms mounted on the shaft and having pawl-and-ratchet connection therewith, and means for preventing disengagement of the pawl-and-ratchet mechanism during the stroke of any arm whereby the latter is held against retractile movement until its full stroke is completed.

34. The combination with a computing device, a rotary actuator therefor, and an actuator-shaft provided with a series of driving-ratchets, of a series of driving-arms mounted to swing from the shaft and each having a pawl disposed to engage a driving-ratchet, and guarding means retaining each pawl in engagement with the ratchet during the effective stroke of the driving-arm, whereby said arm is held against retraction until its full stroke has been completed.

35. The combination with a computing device, its rotary actuator, and an actuator-shaft provided with a series of driving-ratchets, of a driving-arm loosely mounted on the shaft adjacent to each driving-ratchet, a pawl carried by each arm and arranged to engage the adjacent ratchet, a segmental guard associated with each driving-ratchet, and a projection extending from each pawl and engaged by the adjacent guard, whereby the pawl is held in engagement with the ratchet until the full stroke of the driving-arm is completed.

36. The combination with a computing device and its actuator, of keys, and connections between the keys and the actuator, said connections including pawl-and-ratchet mechanism and stationary guarding means preventing premature disconnection of the pawl-and-ratchet mechanism and thereby preventing any key from rising before its full stroke is completed.

37. The combination with a computing device, its actuator, and actuator-shaft, of an oscillatory driving-arm mounted on the shaft, a driving-ratchet fixed to the shaft, a driving-pawl carried by the arm and engaging the ratchet and having a lateral projection, a fixed guard engaging said projection to prevent the pawl from being prematurely disengaged from the ratchet, a set of levers for operating the driving-arm, and a key for operating said levers.

38. The combination with a computing device, of an operating connection therefor including a pawl and a ratchet-wheel, and a stationary cam for positively moving the pawl into engagement with the wheel at the proper time.

39. The combination with a computing device, of an operating connection therefor including a ratchet-wheel and a pawl movable into and out of engagement therewith, and a stationary combined cam and guard associated with the pawl to positively urge the latter into engagement with the ratchet-wheel and to prevent premature disengagement thereof.

40. The combination with a computing device, of an operating connection therefor including a ratchet-wheel and a driving-arm having a pawl arranged to engage the ratchet-wheel to rotate the same, a lateral projection on said pawl, and a fixed arcuate guard having a cam-shaped end arranged to be engaged by the lateral projection on the pawl to urge said pawl into engagement with the ratchet-wheel and to compel said projection to move along the inner face of the guard for the purpose of preventing premature disengagement of the pawl from the ratchet.

41. The combination with a computing device including a series of denominational members, of a plurality of separate independent operating connections all of which are common to each denominational member, each connection being capable of operation during the retraction of another connection, and means for preventing the reactuation of any one of said connections before it has been completely retracted.

42. The combination with a computing device, its actuator and actuator-shaft, of a series of driving-arms mounted on said shaft and each having independent pawl-and-ratchet connection therewith, and independent devices for dogging the respective arms against reactuation until their retractile movement is completed.

43. The combination with a computing device, its actuator and actuator-shaft, of a driving-arm and a driving-ratchet mounted on the shaft, a pawl carried by the arm and engaging the ratchet to rotate the shaft, and a toothed segment engaged by the pawl during the retractile movement of the latter and preventing movement of the pawl in a direction to operate the shaft before the driving-arm has been completely retracted.

44. The combination with a computing device, its actuator and actuator-shaft, of a series of driving-ratchets fixed to the shaft, a series of driving-arms loosely mounted on the shaft, pawls carried by the arms to engage the ratchets, and a toothed segment disposed adjacent to each pawl and arranged to be engaged by the latter during its retractile movement to prevent reactuation of the actuator by a driving-arm prior to the complete retraction of the latter.

45. The combination with a computing device including a series of denominational members and a series of operating-keys all of which are common to each member, of means preventing the reoperation of any one of said keys prior to its complete retraction.

46. The combination with a computing device including a series of denominational members, a master-actuator common to said members, and an actuator-shaft rotatable in one direction only, of a plurality of keys, a separate independent connection between each key and the shaft, each of said connections being arranged to be operated during the retraction of another connection, and means for preventing the reactuation of a connection before its retractile movement is completed.

47. The combination with a computing device, an actuator therefor, and an actuator-shaft provided with a series of fixed driving-ratchets, driving-arms mounted to swing from the actuator-shaft and having pawls engaging the ratchets, a series of keys, a set of levers for transmitting motion from each key to a driving-arm, and a toothed segment engaged by each pawl during its retractile movement to prevent reactuation of the arm associated with said pawl before the limit of its retractile movement is reached.

48. The combination with a computing device, of an operating connection therefor including a ratchet-wheel, a pawl disposed to engage and move the wheel, means for positively moving the pawl into engagement with the ratchet-wheel, and means for dogging the pawl during its retractile movement.

49. The combination with a computing device including a series of denominational members, of a series of independent operating connections all of which are common to each member, each connection being arranged to be actuated while another connection is being retracted, and means whereby each connection will be held unyieldingly against retraction prior to the completion of its full stroke and against reactuation prior to the completion of its retractile movement.

50. The combination with a computing device including a series of denominational members and operating-keys all of which are common to each member, of means whereby each key will be held unyieldingly against retraction until its full stroke is completed and against reoperation until its full retractile movement is completed.

51. The combination with a computing device, an actuator therefor, and an actuator-shaft, of a driving-ratchet mounted on the shaft, a driving-pawl disposed to engage the ratchet, and an arcuate flange provided with a series of teeth, said flange serving as a guard to hold the pawl in engagement with the ratchet during the operating movement of the arm and also coöperating with the pawl during the retractile movement of the arm to prevent the reactuation of said arm before its retractile movement is completed.

52. The combination with a computing device, its actuator and actuator-shaft, of a driving-ratchet mounted on the shaft, a driving-arm also mounted on the shaft, a pawl carried by the arm to engage the ratchet and having a lateral projection, and an arcuate flange disposed concentric with the driving-ratchet and having a cam at one end and a series of teeth on its exterior surface, the cam end of the flange serving to positively move the pawl into engagement with the driving-ratchet and to cause said projection to ride under the flange and thus be retained positively in engagement with the ratchet during the operating movement of the driving-arm, and the teeth on said flange serving to coöperate with the projection on the pawl for the purpose of preventing reactuation of the driving-arm until its retractile movement is completed.

53. The combination with a computing device, its actuator and actuator-shaft, of a series of keys, an independent connection between each key and the actuator-shaft, said connection including a driving-arm mounted on the shaft and having pawl-and-ratchet connection therewith, a set of levers for transmitting movement from the key to the driving-arm, and separate means associated with each connection for preventing retraction of the connection prior to the completion of a full stroke and also preventing reactuation of the connection prior to the completion of its retractile movement.

54. The combination with a computing device, a traveling carriage, and numeral-keys movable with the carriage and arranged to impart differential movement to the computing device, of means for preventing retraction of the keys before a full key-stroke is completed, and means preventing reactuation of a key before it has been fully retracted.

55. The combination with a computing device, its actuator and actuator-shaft, of a series of driving-arms having pawl-and-ratchet connection with the shaft, a check-arm disposed to engage the actuator to prevent overrunning thereof, and a universal bar operatively connected to the check-arm and disposed to be operated by each of the driving-arms.

56. The combination with a computing device, its actuator and actuator-shaft, of a series of driving-arms for operating said shaft, and a universal check-bar provided with a check-arm disposed to engage the actuator and with a series of arms each arranged in the path of movement of one or the driving-arms.

57. The combination with a computing device, its actuator and actuator-shaft, of a series of driving-arms mounted on the actuator-shaft and having pawl-and-ratchet connection therewith, a series of keys for operating the driving-arms, and means operated by each driving-arm as the latter reaches the limit of its movement to check the actuator and prevent overrunning thereof.

58. The combination with a computing device having a series of denominational members, its master-actuator and actuator-shaft, of a series of keys, a separate independent connection between each key and the actuator-shaft, a total-key, and means operated by the total-key for simultaneously disconnecting all of the operating connections from the keys first named.

59. The combination with a computing device having a series of denominational members, a master-actuator therefor, a series of levers for operating the same, and a series of keys for operating the levers, of swinging links connecting the levers with the keys, and a key arranged to swing the links simultaneously to effect the disconnection of the first-named keys from the operating connections of the computing device.

60. The combination with a computing device having a series of denominational members, a master-actuator therefor, of a series of keys provided with stems having notched pins, and operating connections between the keys and the computing device including elements having projections engaging the notches in the pins and shiftable to disconnect the keys.

61. The combination with a computing device having a series of denominational members, and a master-actuator therefor, of a support, a plurality of operating-keys for the computing device, operating connections mounted on the support and comprising links passed through the support and having operative connection with the keys, and a universal bar located below the support and disposed to swing the links out of operative relation with the keys.

62. The combination with a computing device and operating-keys therefor, of a plurality of operating connections located between the keys and the computing device and including a series of slotted members movable into and out of operative position, and a universal bar disposed within the slots of said members to normally guide the latter in their movements, and means for moving the universal bar to shift the slotted members into and out of operative position.

63. The combination with a computing device, a support, and a plurality of operating-keys, of a series of operating connections mounted on the support to transmit motion from the keys to the computing device, each of said connections including a member movable into and out of operative position, a key located above the support, and a swinging yoke located below the support and operated by the key last named to effect the disconnection of the first-named keys.

64. The combination with a computing device having transfer-levers, of a lever-depressing member having a yielding section.

65. The combination with a computing device having transfer-levers, of a lever-depressing arm movable relative to the computing device to engage and disengage the levers, said arm having a yielding end section.

66. The combination with a computing device, an actuator-shaft, and a rotary actuator mounted on the shaft, of a series of oscillatory driving-arms arranged to rotate the shaft in one direction only, a series of keys, and a series of levers, each of said levers directly engaging a driving-arm and operatively related to a key.

67. The combination with a computing device, of an actuator-shaft, a rotary actuator mounted on the shaft, a series of oscillatory driving-arms also mounted on the shaft, a series of keys, and a series of levers, each of said levers being directly geared to a driving-arm and arranged to be operated by a key.

68. The combination with a computing device, a master-wheel therefor, a shaft supporting the wheel, a series of oscillatory arms mounted on the shaft, mechanism for connecting each arm with the shaft when the arm is swung in one direction, a toothed segment carried by each arm, a lever geared to each segment, and a key for operating each lever.

69. The combination with a computing device, a rotary actuator therefor, and an actuator-shaft supporting the actuator, of a plurality of keys, and an independent operating connection between each key and the shaft, each connection including an oscillatory toothed member mounted on the shaft, means for connecting said member with the shaft when swung in one direction and for permitting its independent movement in the opposite direction, and a lever operated by a key and having a toothed segment meshing with the toothed member on the shaft.

70. The combination with a computing device, a rotary actuator therefor, and a series of oscillatory driving members mounted on the shaft, of a series of levers directly geared to the driving members, and keys connected with said levers at different distances from the fulcrums thereof.

71. The combination with a computing device, and a laterally-movable actuator therefor, of a series of keys, separate operating connections between the keys and the actuator and designed to impart different degrees of rotary movement thereto, and means preventing the rising of a key before the same has been fully depressed.

72. The combination with a computing device and its actuator, of an actuator-shaft, a series of oscillatory driving members mounted on the shaft, pawl-and-ratchet mechanism connecting each driving member with the shaft, and means coöperating with an element of the pawl-and-ratchet mechanism for preventing the retraction of the driving member until its full stroke has been completed.

73. The combination with a computing device, its actuator, and an actuator-shaft, of a series of independent driving members mounted on the shaft and having pawl-and-ratchet connection therewith, and means for preventing the disengagement of the pawl-and-ratchet mechanism during the stroke of any driving member, whereby the latter is held against retractile movement until its full stroke is completed.

74. The combination with a computing device and its actuator, of a series of oscillatory driving members for said actuator, and independent devices for dogging the respective driving members against reactuation until their retractile movement is completed.

75. The combination with a computing device, its actuator, and actuator-shaft, of a series of oscillatory driving members for the shaft, pawls for connecting the driving members to the shaft, and toothed members engaged by the pawls during the retractile movement of the driving members and preventing movement of said members in a direction to operate the shaft before said driving members have been completely retracted.

76. The combination with a computing device, its actuator, and actuator-shaft, of a series of oscillatory driving members mounted on the shaft and arranged to impart intermittent rotary movement to the shaft, and means for preventing movement of any driving member to operate the shaft before said member has been completely retracted, said means including pawls and a coöperating series of ratchets.

77. The combination with a computing device, an actuator therefor, and an actuator-shaft, of a series of oscillatory driving members for said shaft, a series of keys, means for transmitting motion from each key to a driving member, and pawl-and-ratchet mechanism for preventing reactuation of any member before the limit of its retractile movement is reached.

78. The combination with a computing device, an actuator therefor, and an actuator-shaft provided with a series of fixed driving-ratchets, oscillatory driving members mounted on the actuator-shaft and having pawls engaging the ratchets, a series of keys, means for transmitting motion from each key to a driving member, and a toothed member engaged by each pawl during its retractile movement to prevent reactuation of the driving member associated with said pawl before the limit of its retractile movement is reached.

79. The combination with a computing device, of an operating connection therefor including a shaft, a driving member, a pawl for connecting the driving member with the shaft, a stationary device for causing positive movement of the pawl to its engaging position, and means for dogging the driving member during its retractile movement.

80. The combination with a computing device, an actuator therefor, an actuator-shaft, a series of oscillatory driving members mounted on the shaft, keys for operating the driving members, and means operated by each of said driving members for preventing overrunning of the actuator.

81. The combination with a computing device, an actuator therefor, and a series of keys, of a series of oscillatory driving-arms operated by the keys, a check device disposed to prevent overrunning of the actuator, and a universal bar mounted to be operated by each of the driving-arms to move the check device to its engaging position.

82. The combination with a computing device, its actuator, and a series of driving members for the actuator, of a check-arm for preventing overrunning of the actuator, and a universal check-bar arranged to move the check-arm and having a series of arms each arranged in the path of movement of one of the driving members.

83. The combination with a type-writing machine, of a computing device, an actuator for the computing device, a separate operating connection between each numeral-key of the type-writer and the actuator, an extra key located at the keyboard of the type-writer, and means operated by said extra key for disconnecting the several operating connections from the numeral-keys to permit the printing of numerals without operating the computing device and without having said keys burdened by the operating connections.

84. The combination with a type-writing machine having numeral-keys, of a computing device, operating connections between the keys and the computing device including a series of swinging members movable into and out of operative relation with the keys, a bodily-shiftable universal bar arranged to swing said members out of operative relation with the keys, and an extra key located at the keyboard of the type-writing machine and arranged to move the universal bar.

85. The combination with a type-writer, of a computing device, operating connections between the numeral-keys of the type-writer and the computing device, said connections having certain elements thereof movable into and out of operative position, a yoke for moving said elements, and an extra key located at the keyboard of the type-writer for operating the yoke.

86. The combination with a type-writer and a computing device, of operating connections each of which transmits motion from a numeral-key of the type-writer to the computing device, a member common to all of said connections, and an extra key located at the keyboard of the type-writer for moving said member to disconnect the several operating connections from the numeral-keys to permit the printing of numerals without operating the computing device.

87. The combination with a computing device, of a series of keys, and mechanism operatively connecting said keys with the computing device, said mechanism including several sets of levers each appropriated to a key, the levers of each set being connected together in graduated arrangement with the connections between the levers of the other sets.

88. The combination with a computing device, of operating mechanism therefor including a key, an actuator, and a pair of intermediate crossed levers, said levers being terminally fulcrumed and operatively connected at their points of intersection.

In testimony that we claim the foregoing as our own we have hereto affixed our signatures in the presence of two witnesses.

CHARLES FREDERICK LAGANKE.
JOHN ASBURY SMITH.

Witnesses:
JOHN H. SIGGERS,
GEORGE TATE.